March 13, 1956 C. B. CREVELING ET AL Re. 24,128
CONVERTIBLE HASSOCK AND BED COMBINATION
Original Filed Dec. 5, 1951 3 Sheets-Sheet 1
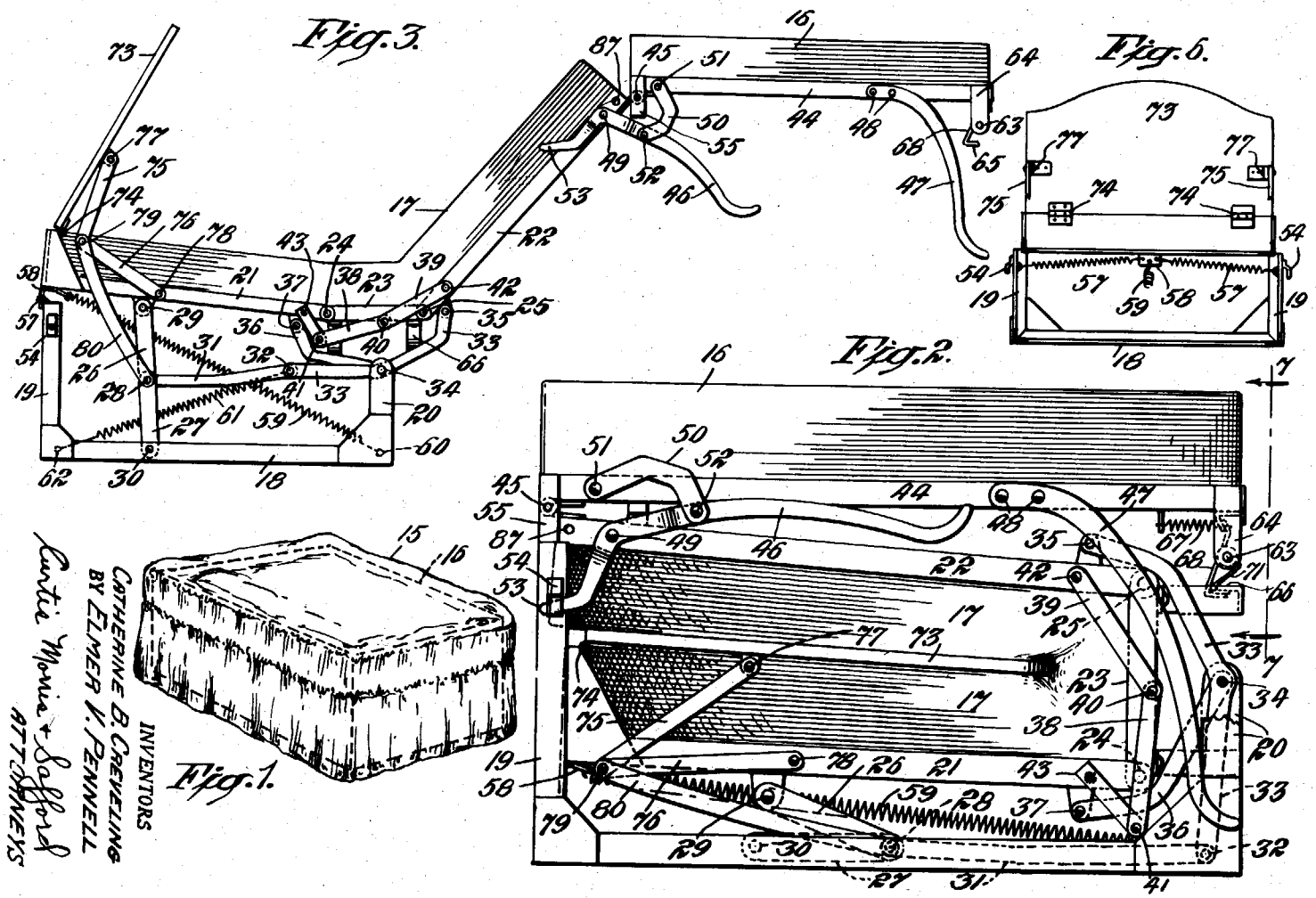
INVENTORS
CATHERINE B. CREVELING
BY ELMER V. PENNELL
Curtis Morris & Safford
ATTORNEYS March 13, 1956 C. B. CREVELING ET AL Re. 24,128

CONVERTIBLE HASSOCK AND BED COMBINATION

Original Filed Dec. 5, 1951 3 Sheets-Sheet 2

INVENTORS
CATHERINE B. CREVELING
BY ELMER V. PENNELL
Curtis Morris & Safford
ATTORNEYS CONVERTIBLE HASSOCK AND BED COMBINATION
Original Filed Dec. 5, 1951 3 Sheets-Sheet 3
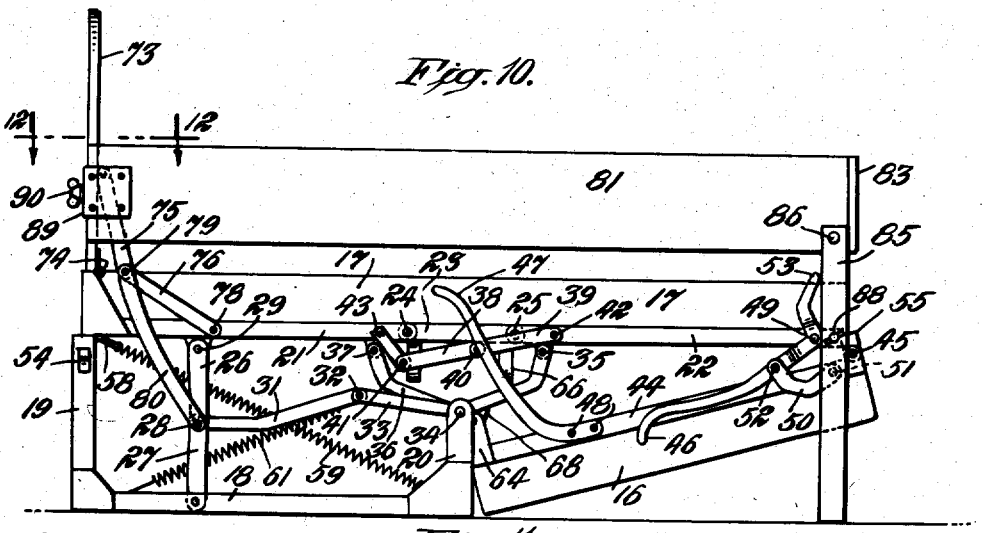
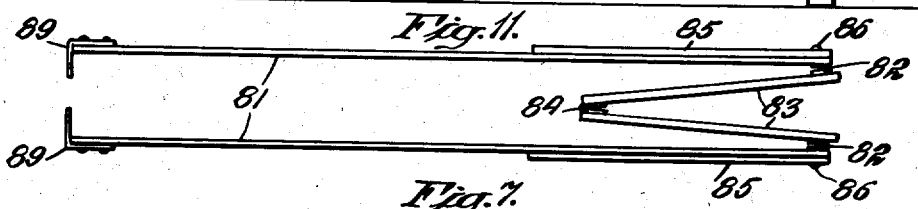
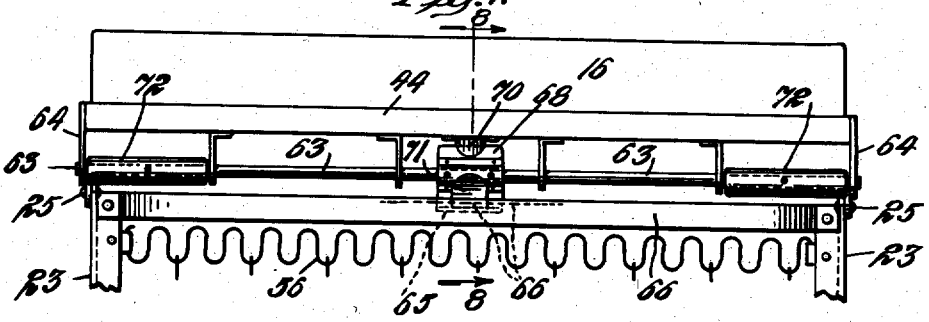
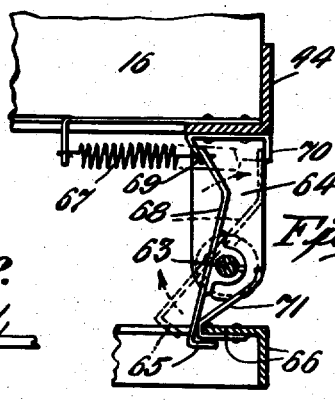
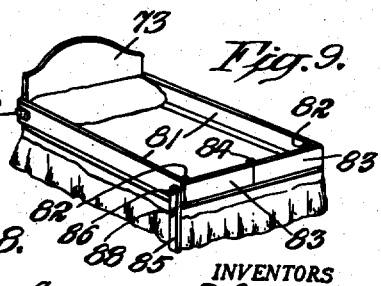
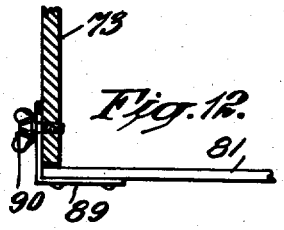
INVENTORS
CATHERINE B. CREVELING
BY ELMER V. PENNELL
Curtis Morris & Safford
ATTORNEYS United States Patent Office Re. 24,128
Reissued Mar. 13, 1956

24,128

CONVERTIBLE HASSOCK AND BED COMBINATION

Catherine B. Creveling and Elmer V. Pennell, Patterson, N. Y., assignors to Castro Decorators, Inc., New Hyde Park, N. Y., a corporation of New York Original No. 2,664,145, dated December 29, 1953, Serial No. 259,936, December 5, 1951. Application for reissue December 13, 1954, Serial No. 475,597

14 Claims. (Cl. 155—45)

Matter enclosed in heavy brackets [ ] appears in the original patent but forms no part of this reissue specification; matter printed in italics indicates the additions made by reissue.

The invention herein disclosed is known under the trade name "Hassock-bed" and comprises a new article of furniture which can be used either as a bed or as a hassock, and be converted at will from the one type of furniture into the other.

Special objects of the invention have been to enable the quick and easy conversion from the one form of furniture into the other and to have in each instance a fully useful and practical structure, that is, the bed in the one instance and the hassock in the other instance.

More specifically it has been a purpose of the invention to enable the conversion to be accomplished practically in a single continuous operation, the hassock to be opened out into a bed in a continuous unfolding operation and conversely, the bed to be changed back into a hassock by a simple and practically continuous folding and closing operation.

Special objects of the invention also are to so counterbalance the parts that only slight effort will be required to effect the unfolding and folding operations.

It is a purpose of the invention also to insure that the parts will be firmly and securely locked in the closed or folded condition, but in such a way that they may be quickly unlocked when the conversion from hassock to bed-forming structure is to be made.

Other important objects of the invention are to accomplish all the foregoing with a relatively simple and low cost form of construction.

Other desirable objects and the novel features through which the purposes of the invention are attained are set forth or will appear in the course of the following specification.

The drawings accompanying and forming part of the specification illustrate a present practical embodiment of the invention but structure may be modified and changed as regards the immediate illustration, all within the true intent and scope of the invention as hereinafter defined and claimed.

Fig. 1 in the drawings is a perspective view of the invention in the form of and use as a hassock;

Fig. 2 is an enlarged side elevation of the folded hassock-forming structure as it appears after the hassock slip cover has been removed;

Fig. 3 is a side elevation showing the parts in the unfolding or opening operation;

Fig. 6 is a vertical cross sectional view with parts appearing as on substantially the plane of line 6—6 of Fig. 4;

Fig. 7 is a broken end elevation of the locking mechanism appearing as on substantially the plane of line 7—7 of Fig. 2;

Fig. 8 is an enlarged broken part sectional detail of the lock mechanism as on substantially the plane of line 8—8 of Fig. 7;

Fig. 9 is a perspective view showing how the device may be shortened for use as a child's bed, by folding under the end frame section and placing a bed or crib-forming frame about the shortened frame structure;

Fig. 10 is a side elevation of the parts in this latter condition, providing the child's bed;

Fig. 11 is a plan view of the folding frame which can be attached to form the sides of this bed;

Fig. 12 is an enlarged broken sectional detail showing how the folding frame may be secured to the headboard.

Fig. 1 shows the invention in use as a hassock, with a slip cover 15 over the cushion 16 which forms the top of the folded hassock-forming structure shown in Fig. 2.

Figures 4, 5:
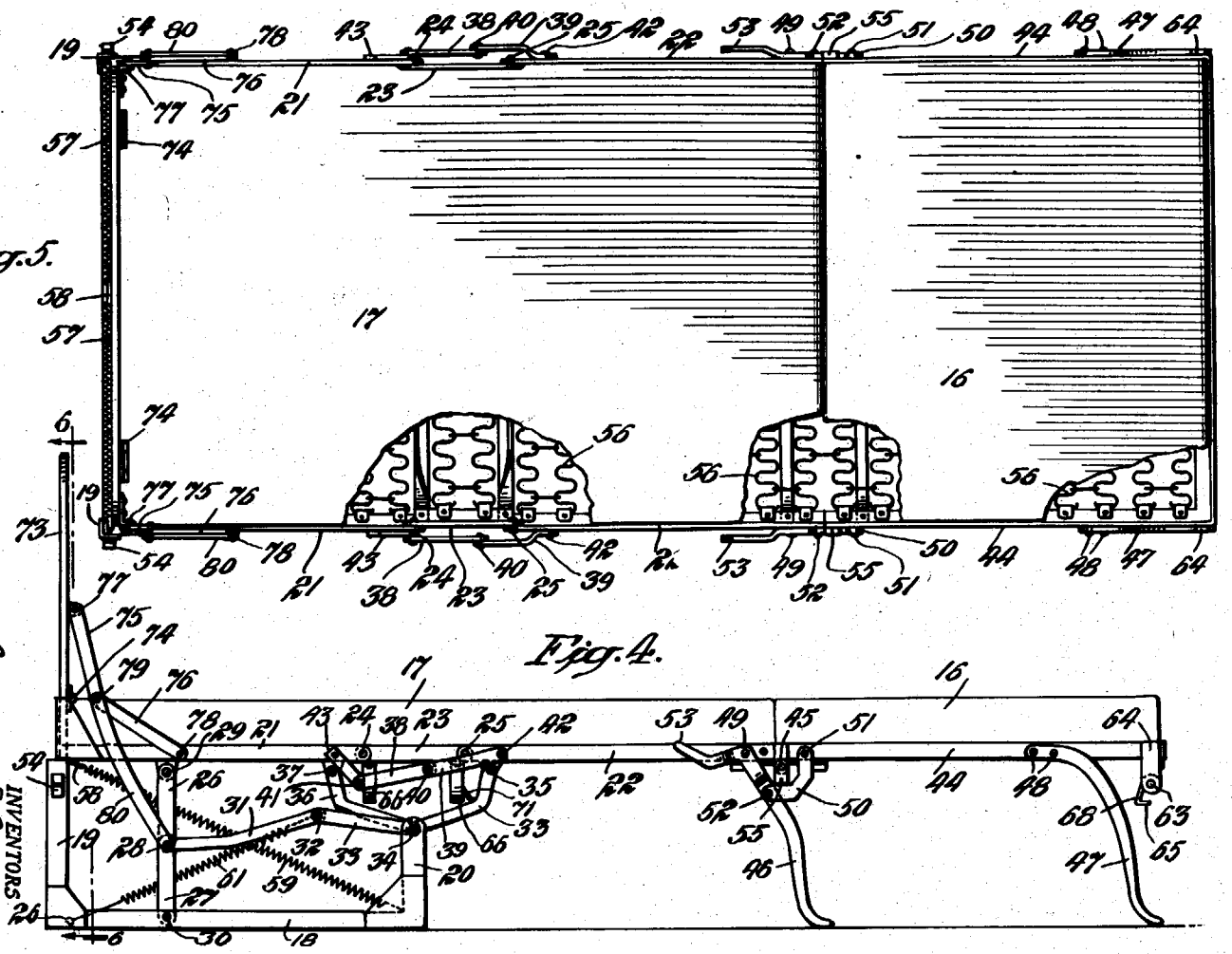
Fig. 4 is a similar view showing the parts completely opened out into the bed-forming relation.
Fig. 5 is a broken plan view of the same.

This single cushion 16, in addition to providing the top of the hassock, cooperates with a foldable, double cushion 17, as shown in Figs. 3 and 4, to provide the complete, full length bed mattress.

These coextensive mattress-forming cushions are mounted so that the double length cushion will automatically unfold and line up with the single cushion as the latter is lifted and will automatically fold up beneath the single cushion as the latter is returned to position over the hassock base.

The base of the hassock, last referred to, is indicated in several views as a substantially rectangular frame 18 to rest on the floor, having a pair of upright posts 19 at the *rear* corners which become the head of the bed, and a pair of shorter upright posts 20 at [those] *the front* corners which are located intermediate the length of the bed.

The latter posts provide the pivotal supports for the hingedly connected frames 21, 22, which carry the folding sections of the double mattress cushion.

The [outer or end] *inner* frame 21 is shown pivotally connected with the [inner or] intermediate frame 22 by hinge links 23 having the pivot connections 24, 25, at opposite ends.

These double jointed hinge connections enable the cushion to fold smoothly, as shown in Fig. 2, without cramping or squeezing.

The [end] frame 21 is shown supported at the [outer] *rear* end by toggle links 26, 27, pivotally connected together at the center, at 28, and pivoted at the ends, at 29, 30, to [end] frame 21 and to the base, respectively. The center pivots are shown connected by links 31 to pivot pins 32 on the ends of levers 33 which are pivoted intermediate their ends at 34 on posts 20, and have their opposite ends pivoted at 35, underneath frame 22 at the far side of the hinge pivot 25.

As a result, the lifting and unfolding operation of the intermediate frame 22, as shown in Figs. 3 and 4, will impart a straightening action to the toggle links 26, 27, to lift the [outer] *rear* end of [end] *inner* frame 21.

At the same time, the [inner] *front* end of this frame is guided up into horizontal position by links 36 engaged with pivots 34 on the posts 20 and pivotally connected with the [inner] *front* end of the frame at 37.

In the fully extended, horizontal relation shown in Fig. 4 the [end] *inner* and intermediate frames 21 and 22 are locked by toggle links 38, 39, pivotally connected together at the center at 40 and pivoted at their outer ends at 41, 42, with downwardly angled extensions 43 of the frame 21, and with frame 22. This toggle linkage and interlocking relation prevents breakdown of the hingedly connected frames under application of undue or excessive pressure.

The downwardly inclined extensions 43 for the connection of toggle links 38 and 39 cause these links to break at the center connection 40 as the bed starts folding from the Fig. 3 to the fully folded, Fig. 2, position.

The frame 44 for the single top cushion 16 is shown as [pivotally] *hingedly* connected at 45 with the intermediate frame 22 so as to fold over and carry cushion 16 over the top of intermediate frame 22 as the three frames are hinged over each other from the Fig. 3 to the Fig. 2 position.

The [outer] *front* ends of intermediate frame 22 and end frame 44 are supported by leg members 46 and 47, the latter rigidly secured to frame 44 at 48 and the former pivotally secured to frame 22 at 49.

Links 50, pivotally connected with the outer frame 44 at 51, and pivotally connected at 52 with legs 46, serve to lower the latter into position for supporting the intermediate frame in horizontal relation as the structure is drawn out to the Fig. 4 position. These links 50 serve to fold the pivoted legs 46 in the reverse, folding operation, as indicated in Figs. 3 and 2.

In the completely folded condition, upwardly projected, angular extensions 53 of legs 46 engage in projecting brackets 54 on posts 19 to aid in locking and securing the parts in fully folded relation.

To lock the inner or intermediate set of legs 46 against collapsing tendency, the outer frame member 44 is shown provided with dependent lugs 55 to bear upon the [leg extending struts] *links* 50 in the fully extended position of the parts shown in Fig. 4.

The three hingedly connected frames 21, 22 and 44 are shown in Fig. 5 as carrying suitable mattress supporting springs 56 foldable on the hinging lines so as not to interfere with the free folding and unfolding operations described.

To further facilitate the unfolding and folding operations the parts are balanced and counterbalanced in the illustration by elongated helical springs 57 connected between an intermediate lug 58 on the end of [end] frame 21 and [outer] corner posts 19, Figs. 5 and 6, and a spring 59 connected between this lug and the mid-portion of the base at 60, Fig. 3. Other extension springs, 61, are shown connected between the end pivots 32 of levers 33 and anchorage points 62 in the [outer] *rear* corners of the base.

These springs have the effect of partially supporting and counter-balancing the pivotally mounted frame sections, enabling the latter to be smoothly and easily drawn up out of and returned to relatively folded relation in the base.

The parts are preferably [balanced so as to be] biased in the folding direction, and in addition it has been found desirable to lock and secure the structure in the closed, folded condition.

The locking mechanism is shown as consisting of a rod 63, Figs. 2, 7 and 8, journalled in bearings 64 beneath the [outer] *front* end of the outer or upper frame section 44, carrying at the center a hook 65 engageable with a catch 66 attached to the hinge links 23 connecting the inner and intermediate frame sections 21, 22. A spring 67 connected with an upward extension 68 of the hook tends to rock the hook into engagement with the catch or keeper, the extent of the spring movement being limited by the stop 69, Fig. 8. Movement in the opposite direction is limited by a front stop 70 engageable by hook extension 68.

An inclined cam 71, Fig. 8, guides and opens the hook, in the closing movement of the frames, to effect engagement with the catch 66, and cylindrical handles 72 on the end portions of the rod 63 serve for rocking the rod to release the hook from the catch.

In use the handles 72 provide grips for one or both hands, for unlocking the parts and pulling the frames out into the extended relation.

A headboard 73 is shown pivoted to the [inner] *rear* end of the inner frame 21, at 74.

This headboard is automatically raised and lowered in the opening and closing operations and is further utilized to assist in folding and holding the double length cushion 17 by the provision of toggle links 75, 76, pivoted at the ends at 77, 78, to the headboard and to frame 21 and having the center pivot 79 connected by link 80 with the center pivot 28 of the inner frame raising and lowering toggle links 26, 27.

Figs. 2, 3 and 4 show successive positions and operation of headboard 73.

The hinge center 74 for the headboard is located at the [inner] *rear* end of frame 21 and at a height approximating the thickness of the mattress pad 17, so that in the folded relation shown in Fig. 2 it will lie flat between the folds of the pad. In the unfolding relation the frame 22 lifts away from the lowered headboard, as shown in Fig. 3, before the linkage described becomes effective to raise the headboard. Finally, as the parts become fully unfolded and straightened out in the horizontal relation shown in Fig. 4, the linkage 26, 27, 80, 75 and 76, will pull the headboard into upright position, the parts locking in this relation by the toggles 26, 27, reaching or passing dead center relation.

The reverse action takes place in folding from the bed to the hassock-forming condition, it being noted particularly in Fig. 3 that the headboard 73 will be folded down into holding position over the mattress pad 17 before that pad reaches the doubled-up condition, resulting in the finally folded condition shown in Fig. 2.

The lowering of the three spring frames 21, 22, 44, into the base-forming frame 18, as shown in Fig. 2, is of special advantage in that it reduces the over-all height in the folded position to a convenient and comfortable seating height for a hassock, and this compacted or condensed relation of the parts avoids any waste space.

The folded structure, therefore, is as small and compact as may be desirable for a hassock, and this is accomplished without reducing the overall dimensions of the bed, for the three folding sections of the hassock will provide the frame of a full size bed.

It will be clear from the foregoing that in the folded relation shown in Fig. 2 the parts are securely locked by engagement of leverage extensions 53 of intermediate pivoted legs 46 with the catches or keeper lugs 54 on the sides of posts 19, and by engagement of hook 65 on the upper or outer frame section 44 with catch 66 on intermediate frame 22.

In this condition the device provides a substantial, practical hassock-forming foundation with a top cushion 16 and may be used for general hassock purposes.

Instead of an ornamental slip cover such as shown in Fig. 1, other covers may be employed, such as a cover simulating the appearance of a wall cabinet or stand, and which could be applied with the folded device standing on its side instead of resting on the bottom. The locked condition permits of this turning the device on its side, enabling it to be placed against a wall and used as a table, or to be stored in this position in a closet or the like. Casters or feet may be provided on the base frame for supporting it flat or on edge and to aid in shifting about.

To unlock and extend into bed-forming position, the locking rod 63, Fig. 7, may be grasped by the handles 72 and turned to rock the hook 65 out of engagement with catch 66, and then these same handles be used to pull out the top and intermediate frame sections 44, 22, through the Fig. 3 position to the fully extended relation shown in Fig. 4.

In this unfolding relation the inner frame section 21 will be raised from the Fig. 2 position to that shown in Figs. 3 and 4, by the straightening of the toggle links 26, 27, and the upward swinging of links 36, this operation assisted by the pull of the springs 57 and [59] *61*.

In the fully extended relation, Fig. 4, the toggle links 38, 39, straighten out to lock the frames 21, 22, and connecting hinge linkage 23 in extended relation firmly supporting the mattress pad 17 fully flattened out and in abutting engagement with the single mattress pad 16 carried by the outer frame.

Also in the extended position the folding intermediate legs 46 are locked by the lugs 55 overstanding the brace links 50, Fig. 4.

The fully extended bed, therefore, is firmly locked and will not collapse under pressure applied at the hinge connections or elsewhere.

The hinged relation between the three bed-forming frame sections enables the device being shortened to form a child's bed or crib.

As shown in Figs. 9 to 12, the outer or top frame section 44 may, if desired, be swung in under the intermediate frame section 22, about the connecting pivot 45, thus shortening the bed structure to the combined length of the hingedly connected sections 21 and 22, amounting to the length of the double or foldable mattress pad 17.

A removable side frame may be used in this partially extended condition, the same being shown as made up of side boards 81, hingedly connected at their ends at 82 with end boards 83 hinged together at 84.

Legs 85 are shown pivoted to the side boards at 86, in position to swing down over the outer end of frame 22, and which frame has screw seats 87 to receive the thumb screws 88 or like fasteners which can be passed through the openings in the legs into the end of the frame to support this end of the frame and to secure the legs in upright position.

At the other end the side boards 81 are shown secured to the headboard 73 by angle plates 89 reaching around the edges of the headboard and through which thumb screws or other fastenings 90 are passed into the headboard.

The folding frame 81, 83, is quickly attachable and detachable and may be easily applied to convert the partly unfolded structure into a shortened bed or crib such as shown in Fig. 9.

The invention has the advantage of automatically extending the mattress out into flattened condition, ready for use, in the simple act of opening and unfolding the connected frames, so that there are no heavy operations of separately handling the mattress. The mattress pads are attached to the frame sections so as to move therewith. The fastenings for the purpose may be in the nature of tapes or the like, so that the pads may, when desired, be readily removed for cleaning or replacement.

The motions of the mattress carrying frames are substantially counter-balanced so that very little effort is required in the extending and folding operations. The parts fold naturally and easily into position, one over the other, it being noted that levers 33, pivoted on the base, support the inner end of the intermediate frame 22 and also, as the parts are lowered, serve to swing this frame inwardly into alignment over the lower, inner frame member.

What is claimed is:

1. A folding bed and hassock combination comprising a base frame of approximate hassock outline dimensions, three hingedly connected frames of substantially equal size, foldable, one over the other, into said base frame, a folding mattress pad overlying and carried by the inner and intermediate of said frames, a smaller, non-folding mattress pad carried by the outer frame for coextensive abutting engagement with the first mattress pad when unfolded, toggle levers connected between said base frame and said inner mattress pad carrying frame for automatically raising and lowering the inner mattress frame in respect to said base frame in the unfolding and folding movements of said hingedly connected frames [and], levers connected with said intermediate frame and with said toggle levers for actuating said toggle levers *and means for supporting the unfolded frames in the extended position of said frames.*

2. A folding bed and hassock combination comprising a base frame, hingedly connected, coextensive inner, intermediate and outer mattress frames, [a double length foldable mattress pad carried by the inner and intermediate mattress frames, a single length mattress pad carried by the outer mattress frame for abutting engagement with the outer end of the foldable pad,] a double hinge connection between the inner and intermediate frames [permitting folding movement of the double length mattress pad carried thereby], a hinge connection between the intermediate frame and outer frame permitting folding movement of said outer frame over the top of the intermediate frame, toggle links connected between the base frame and the inner mattress frame to raise and lower the inner frame in respect to the base frame, levers pivoted on the base frame [for] supporting the intermediate frame on the base frame, links extending from said levers to said toggle links for actuating said toggle links in the unfolding and folding movements of the frames and means for supporting the outer frame in the extended position of said frames.

3. A folding bed and hassock combination comprising a base frame, hingedly connected, coextensive inner, intermediate and outer mattress frames, [a double length foldable mattress pad carried by the inner and intermediate mattress frames, a single length mattress pad carried by the outer mattress frame for abutting engagement with the outer end of the foldable pad,] a double hinge connection between the inner and intermediate frames [permitting folding movement of the double length mattress pad carried thereby], a hinge connection between the intermediate frame and outer frame permitting folding movement of said outer frame over the top of the intermediate frame, toggle links connected between the base frame and the inner mattress frame to raise and lower the inner frame in respect to the base frame, levers pivoted on the base frame [for] supporting the intermediate frame on the base frame, links extending from said levers to said toggle links for actuating said toggle links in the unfolding and folding movements of the frames and means for supporting the outer frame in the extended position of said frames, a headboard pivoted to the inner mattress frame, toggle links connected between said inner mattress frame and headboard for raising and lowering the headboard and a link connected between the center pivot of said toggle links and the center pivot of the raising and lowering toggle links for effecting the raising and lowering of the headboard conjointly with the raising and lowering of said inner mattress frame.

4. A folding bed and hassock combination comprising a base frame, hingedly connected, coextensive inner, intermediate and outer mattress frames, [a double length foldable mattress pad carried by the inner and intermediate mattress frames, a single length mattress pad carried by the outer mattress frame for abutting engagement with the outer end of the foldable pad,] a double hinge connection between the inner and intermediate frames [permitting folding movement of the double length mattress pad carried thereby], a hinge connection between the intermediate frame and outer frame permitting folding movement of said outer frame over the top of the intermediate frame, toggle links connected between the base frame and the inner mattress frame to raise and lower the inner frame in respect to the base frame, levers pivoted on the base frame [for] supporting the intermediate frame on the base frame, links extending from said levers to said toggle links for actuating said toggle links in the unfolding and folding movements of the frames and means for supporting the outer frame in the extended position of said frames, a hinge rod carried by the outer mattress frame, a hook carried by said rod for engagement with a portion of the [intermediate frame] *double hinge connection* for securing the parts in the collapsed folded position with the outer frame overlying the intermediate frame and said intermediate frame overlying the inner frame.

5. A folding bed and hassock combination comprising a base frame, hingedly connected, coextensive inner, intermediate and outer mattress frames, [a double length foldable mattress pad carried by the inner and intermediate mattress frames, a single length mattress pad carried by the outer mattress frame for abutting engagement with the outer end of the foldable pad,] a double hinge connection between the inner and intermediate frames [permitting folding movement of the double length mattress pad carried thereby], a hinge connection between the intermediate frame and outer frame permitting folding movement of said outer frame over the top of the intermediate frame, toggle links connected between the base frame and the inner mattress frame to raise and lower the inner frame in respect to the base frame, levers pivoted on the base frame [for] supporting the intermediate frame on the base frame, links extending from said levers to said toggle links for actuating said toggle links in the unfolding and folding movements of the frames and means for supporting the outer frame in the extended position of said frames, said double hinge connection between the inner and intermediate frames being provided by links pivotally connecting said two frames and of a length to permit the doubling over of the foldable mattress pad and toggle links connected between said inner and intermediate frames for locking the same in the extended relation.

6. A folding bed and hassock combination comprising a base frame, hingedly connected, coextensive inner, intermediate and outer mattress frames, [a double length foldable mattress pad carried by the inner and intermediate mattress frames, a single length mattress pad carried by the outer mattress frame for abutting engagement with the outer end of the foldable pad,] a double hinge connection between the inner and intermediate frames [permitting folding movement of the double length mattress pad carried thereby], a hinge connection between the intermediate frame and outer frame permitting folding movement of said outer frame over the top of the intermediate frame, toggle links connected between the base frame and the inner mattress frame to raise and lower the inner frame in respect to the base frame, levers pivoted on the base frame [for] supporting the intermediate frame on the base frame, links extending from said levers to said toggle links for actuating said toggle links in the unfolding and folding movements of the frames, means for supporting the outer frame in the extended position of said frames and spring connections between said levers and the base and between the inner frame and base for counterbalancing and assisting in the opening and closing movements described.

7. A folding bed and hassock combination comprising a base frame, hingedly connected, coextensive inner, intermediate and outer mattress frames, [a double length foldable mattress pad carried by the inner and intermediate mattress frames, a single length mattress pad carried by the outer mattress frame for abutting engagement with the outer end of the foldable pad,] a double hinge connection between the inner and intermediate frames [permitting folding movement of the double length mattress pad carried thereby], a hinge connection between the intermediate frame and outer frame permitting folding movement of said outer frame over the top of the intermediate frame, toggle links connected between the base frame and the inner mattress frame to raise and lower the inner frame in respect to the base frame, levers pivoted on the base frame [for] supporting the intermediate frame on the base frame, links extending from said levers to said toggle links for actuating said toggle links in the unfolding and folding movements of the frames and means for supporting the outer frame in the extended position of said frames, the outer mattress frame being foldable beneath the intermediate frame, in the extended relation of the parts, to constitute a shortened bed structure [substantially the length of the foldable mattress pad].

8. A folding bed and hassock combination comprising a base frame, hingedly connected, coextensive inner, intermediate and outer mattress frames, [a double length foldable mattress pad carried by the inner and intermediate mattress frames, a single length mattress pad carried by the outer mattress frame for abutting engagement with the outer end of the foldable pad,] a double hinge connection between the inner and intermediate frames [permitting folding movement of the double length mattress pad carried thereby], a hinge connection between the intermediate frame and outer frame permitting folding movement of said outer frame over the top of the intermediate frame, toggle links connected between the base frame and the inner mattress frame to raise and lower the inner frame in respect to the base frame, levers pivoted on the base frame [for] supporting the intermediate frame on the base frame, links extending from said levers to said toggle links for actuating said toggle links in the unfolding and folding movements of the frames and means for supporting the outer frame in the extended position of said frames, the outer mattress frame being foldable beneath the intermediate frame, in the extended relation of the parts, to constitute a shortened bed structure [substantially the length of the foldable mattress pad], and a foldable crib frame attachable over said shortened bed-forming combination.

9. A folding bed and hassock combination comprising a hassock outline forming base frame, an inner mattress frame mounted for raising and lowering movements in said base frame, an intermediate mattress frame foldable over the top of said inner mattress frame, hinge links connecting adjoining ends of said inner and intermediate mattress frames in relatively spaced apart relation, [a foldable mattress pad carried by said hingedly connected, inner and intermediate mattress frames and foldable therewith into said base frame,] an outer mattress frame hingedly connected with said intermediate [base] frame and foldable over the back of said intermediate frame, [a nonfolding mattress pad carried by said outer mattress frame in position for coextensive abutting engagement with the foldable mattress pad when the latter is unfolded,] toggle links interposed between the base frame and said inner frame, levers pivotally supporting said intermediate frame on the base, links extending from said last mentioned levers to said toggle links for effecting the raising and lowering of said inner and intermediate frames when the outer frame is raised and drawn away from the base frame or is folded toward the base frame and means for supporting the outer end of said outer frame when the latter is unfolded and drawn away from the base frame.

10. A folding bed and hassock combination comprising a hassock outline forming base frame, an inner mattress frame mounted for raising and lowering movements in said base frame, an intermediate mattress frame foldable over the top of said inner mattress frame, hinge links connecting adjoining ends of said inner and intermediate mattress frames in relatively spaced apart relation, [a foldable mattress pad carried by said hingedly connected, inner and intermediate mattress frames and foldable therewith into said base frame,] an outer mattress frame hingedly connected with said intermediate [base] frame and foldable over the back of said intermediate frame, [a non-folding mattress pad carried by said outer mattress frame in position for coextensive abutting engagement with the foldable mattress pad when the latter is unfolded,] toggle links interposed between the base frame and said inner frame, levers pivotally supporting said intermediate frame on the base, links extending from said last mentioned levers to said toggle links for effecting the raising and lowering of said inner and intermediate frames when the outer frame is raised and drawn away from the base frame or is folded toward the base frame and means for supporting the outer end of said outer frame when the latter is unfolded and drawn away from the base frame, [leg members for supporting the outer end of the outer mattress frame,] leg members pivotally connected with the outer end of the intermediate mattress frame and cooperating elements on said last mentioned leg members and base frame for securing said hingedly connected mattress frames in folded position in said base frame.

11. The folding bed and hassock combination herein disclosed comprising a hassock outline forming base frame, inner, intermediate and outer mattress frames hingedly connected together, toggle links connected between said base frame and inner mattress frame for effecting raising and lowering movements of said inner and intermediate mattress frames in said base frame, said outer frame being foldable over the top of said intermediate frame and over the top of the base frame to constitute the top of a hassock frame, means for releaseably securing said three mattress frames in the folded, hassock formation described, means for supporting the intermediate and outer mattress frames in unfolded relation extended away from the base frame, [a mattress supported by the mattress frames in the extended relation,] levers pivotally supporting said intermediate mattress frame on said base frame and link connections extending from said levers to said toggle links for operating said toggle links to effect the raising and lowering movements of said inner and intermediate mattress frames.

*12. A folding bed and hassock combination comprising a base frame of approximate hassock outline dimensions; inner, intermediate and outer hingedly connected mattress frames of substantially equal size, foldable, one over the other, into said base frame; an expansible linkage mechanism having link members pivotally connected to and between the base frame and the inner frame for automatically raising and lowering the inner mattress frame in respect to said base frame in the unfolding and folding movements of said hingedly connected frames; levers connected with said intermediate frame and with said expansible linkage mechanism for actuating the pivotally connected link members thereof; and means for supporting the unfolded frames in the extended position of said frames.*

*13. A folding bed and hassock combination comprising a base frame of approximate hassock outline dimensions, an inner mattress frame mounted for raising and lowering movements in said base frame, an intermediate mattress frame foldable over the top of the inner mattress frame, hinge links connecting adjoining ends of the inner and intermediate frames in relatively spaced apart relation, an outer mattress frame hingedly connected with the intermediate frame and foldable over the top of the intermediate frame, an expansible linkage mechanism having link members pivotally connected to and between the base frame and the inner frame, means for pivotally supporting the intermediate frame on the base frame, links extending from the last mentioned means to the expansible linkage mechanism for effecting the raising and lowering of the inner and intermediate frames when the outer frame is raised and drawn away from the base frame or is folded toward the base frame, and means for supporting the outer end of said outer frame when the latter is unfolded and drawn away from the base frame.*

*14. A folding bed and hassock combination comprising a base frame of approximate hassock outline dimensions, an inner mattress frame mounted for raising and lowering movements in said base frame, an intermediate mattress frame foldable over the top of the inner mattress frame, hinge links connecting adjoining ends of the inner and intermediate frames in relatively spaced apart relation, an outer mattress frame hingedly connected with the intermediate frame and foldable over the top of the intermediate frame, an expansible linkage mechanism having link members pivotally connected to and between the base frame and the inner frame, means for pivotally supporting the intermediate frame on the base frame, links extending from the last mentioned means to the expansible linkage mechanism for effecting the raising and lowering of the inner and intermediate frames when the outer frame is raised and drawn away from the base frame or is folded toward the base frame, means for supporting the outer end of said outer frame when the latter is unfolded and drawn away from the base frame, a headboard pivoted to the inner mattress frame, linkages connected between the headboard and said expansible linkage mechanism for raising and lowering the headboard conjointly with the raising and lowering of the inner mattress frame, said headboard being adapted, in the lowered position, for perperly folding a mattress pad carried by the inner and intermediate frames when the intermediate frame is folded over the inner frame.*

References Cited in the file of this patent or the original patent

UNITED STATES PATENTS

| | | |
|---|---|---|
| 57,709 | Hambujer | Sept. 4, 1866 |
| 263,179 | House et al. | Aug. 22, 1882 |
| 1,061,986 | Coopersmith | May 20, 1913 |
| 2,193,402 | Frech et al. | Mar. 12, 1940 |
| 2,577,741 | Creveling et al. | Dec. 11, 1951 |

FOREIGN PATENTS

| | | |
|---|---|---|
| 859,244 | France | June 3, 1940 |